United States Patent [19]

Gdula

[11] Patent Number: 4,845,608
[45] Date of Patent: Jul. 4, 1989

[54] DIGITAL SPEED CONTROLLER USING A SINGLE-CHIP MICROCONTROLLER

[75] Inventor: Michael Gdula, Knox, N.Y.

[73] Assignee: General Electric Company, Schenectady, N.Y.

[21] Appl. No.: 135,961

[22] Filed: Dec. 21, 1987

[51] Int. Cl.$^4$ .......................... G05B 1/01; G05B 11/00
[52] U.S. Cl. .................................... 364/166; 364/182; 364/183; 364/565; 318/603; 377/17; 388/810; 388/814; 388/912; 388/933
[58] Field of Search ............... 364/166, 182, 183, 565; 318/318, 603; 377/3, 17

[56] References Cited

U.S. PATENT DOCUMENTS

| | | | |
|---|---|---|---|
| 4,129,862 | 12/1978 | Kaplan et al. | 377/17 X |
| 4,335,600 | 6/1982 | Wu et al. | 73/117.3 |
| 4,408,118 | 10/1983 | Grozinger et al. | 377/17 X |
| 4,649,511 | 3/1987 | Gdula | 364/900 |
| 4,710,688 | 12/1987 | Neki et al. | 318/603 |

Primary Examiner—Allen MacDonald
Attorney, Agent, or Firm—Donald R. Campbell; James C. Davis, Jr.; Paul R. Webb, II

[57] ABSTRACT

A speed regulator digital speed controller for rotating machinery is comprised of a single-chip microcontroller operating in conjunction with a multiple counter/time peripheral, and is programmed in a high level language. Pulses are generated by a digital speed sensor at a rate too low to give the required speed resolution; these pulses are counted and a preset number toggles a binary gate signal. Two clock counters both having an input connected to a high reference frequency oscillator are gated alternately and accumulate a count depending on the length of the gated on interval. These speed related counts are read during alternating gated off intervals into the microcontroller where the speed error is calculated in real time to a high degree of accuracy and resolution. The speed of an electric motor and a steam turbine, for instance, are regulated.

14 Claims, 4 Drawing Sheets

DIGITAL SPEED CONTROLLER USING A SINGLE-CHIP MICROCONTROLLER

BACKGROUND OF THE INVENTION

This invention relates to a digital speed controller for rotating machinery and more particularly to controllers based on the use of a single-chip microcontroller.

Velocity control of rotating machinery, such as steam and gas turbines and rotating electric machines, requires a determination of the present rate compared to a set rate. The resultant error, the speed error, drives a power controller more or less based upon the sign of the result to maintain the system at the set rate. The problem presented, for which a totally satisfactory solution has not yet been suggested, is to replace existing analog speed controls with digital logic. The purpose of doing this is to increase reliability, reduce costs, allow for distributed control and fault tolerance, and other like considerations. While voltage to frequency converters and some digital counting schemes have been implemented to perform some forms of non-critical, low resolution speed control, the use of a microcontroller unit (MCU) to achieve high control loop rates has not been proposed heretofore.

SUMMARY OF THE INVENTION

An object of the invention is to provide a high performance digital speed control for rotating machinery that is based upon a single-chip microcontroller programmed in a high level language and requires no digital to analog conversion with their affiliated errors.

Another object is the provision of such a speed regulator digital controller offering operator chosen parameters.

The improved speed regulator digital speed controller is comprised of means for sensing the speed of rotation of the rotating machinery and generating sensor pulses at a rate that is too low to yield the required speed resolution. The digital speed sensor may be an optical or magnetic pickup which senses passage of the teeth on a toothed wheel, a shaft encoder, or the like. A gate counter toggles a binary gate signal after a preset number of these sensor pulses are counted. A source of high reference frequency pulses and at least two clock counters are provided; the reference pulses are input to the latter which are alternately enabled by the gate signal to count the number of reference pulses during respective gated on intervals. As the machinery speeds up the gate signal is switched more rapidly and the number of reference pulses counted decreases, and vice versa if there is a lower speed. A single-chip microcontroller reads the clock counters during alternate gated off intervals and processes the current speed-related count information to calculate a speed error by taking the difference between a known count corresponding to a set speed and the current count. This error is determined to a high degree of accuracy and resolution and is used to control the rotating machinery and reduce the speed error toward zero.

A feature of the system is that the microcontroller has means to change the set speed to which the machinery is regulated. Another feature is that the reference frequency source is preferably a megahertz range oscillator and the frequency or clock counters both have an input connected to the oscillator output. One clock counter counts reference frequency cycles while the gate signal is high and the other while it is low.

One illustrative embodiment is a digital speed controller for an electric motor. The speed error controls the voltage fed to the motor from a power source. Another embodiment is a steam or gas turbine speed controller; the fluid supplied to the turbine is controlled to change speed. In this system the speed typically is increased by stages to rated speed. A redundant speed controller may be provided for fault tolerant applications.

DETAILED DESCRIPTION OF THE INVENTION

Figure 1:
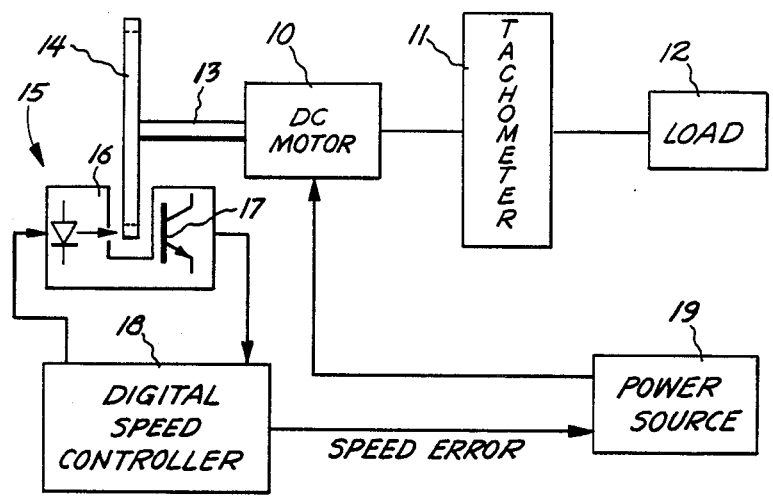
FIG. 1 is a block diagram of a DC motor having a speed regulator digital speed controller according to the invention.

The motor system shown in FIG. 1 has a standard tachometer 11 to measure shaft speed and drives a varying load 12. The tachometer provides an analog voltage output proportional to speed that is not used for this control application. For this implementation there is secured to the motor tail shaft 13 a toothed wheel 14 which is part of the digital speed sensor 15. A photoelectric optical pickup is mounted external to the motor assembly and is comprised of a light emitting diode 16 and a phototransistor 17. The teeth on wheel 14 interrupt the path between light source and detector and one pulse per tooth is generated. These are input to a digital speed controller 18 which is implemented with a single-chip microcontroller. The calculated speed error after being converted to an analog signal is fed to the power source 19 which controls the voltage presented to motor 10. A command to increase motor speed results in a higher voltage fed to the motor, and vice versa if speed is to be decreased.

A single-chip microcontroller is chosen to insure that overall system cost is kept down, and this component otherwise modifies the developed concepts. A microcontroller (MCU) by definition includes a microprocessor in addition to the memory devices and interface input-output devices. The microcontroller is, for instance, the INTEL 8751, a high performance processor with many needed hardware functions available on chip that keep the hardware system design minimal and thus more reliable because fewer additional components are used. It is capable of being programmed in PLM, a subset of the PL-1 programming language. This is a high level language, as is needed in order to keep the software universal and applicable to other speed control applications. The INTEL 8751 furthermore has other forthcoming family members to provide additional features for growth consideration.

Let it be assumed that it is desirable to control the motor with a varying load at a set speed of 3600 RPM. Further, it is required to provide speed error resolution of at least 0.01%, with a regulation of 5%. Regulation is as follows. If the motor is at set speed, the speeder or signal will be zero. This signal will be summed with the set point bias signal to keep the motor drive power such that the set point will be maintained at that moment in time. Within the range of + or −5% overspeed (3780 RPM) to underspeed (3420 RPM) full proportional speed error is calculated in order to command motor drive power to satisfy this regulation requirement.

When the toothed wheel 14 has 80 teeth, this yields a 4800 Hz signal with the motor running at a set speed of 3600 RPM. It was determined this system would have to operate at least at a 60 Hz sample rate. It can be seen that at that rate, the count rate at set speed from the toothed wheel 14 is 80 counts. This does not directly offer the resolution that is required; i.e., the pulse rate generated by the digital speed sensor is too low to yield the required speed resolution. The solution to the problem is to allow the toothed wheel 14 to "gate" a counter connected to a stable 5 MHz crystal reference oscillator. The actual technique to implement the system with the required accuracy and resolution is as follows.

Figure 2:
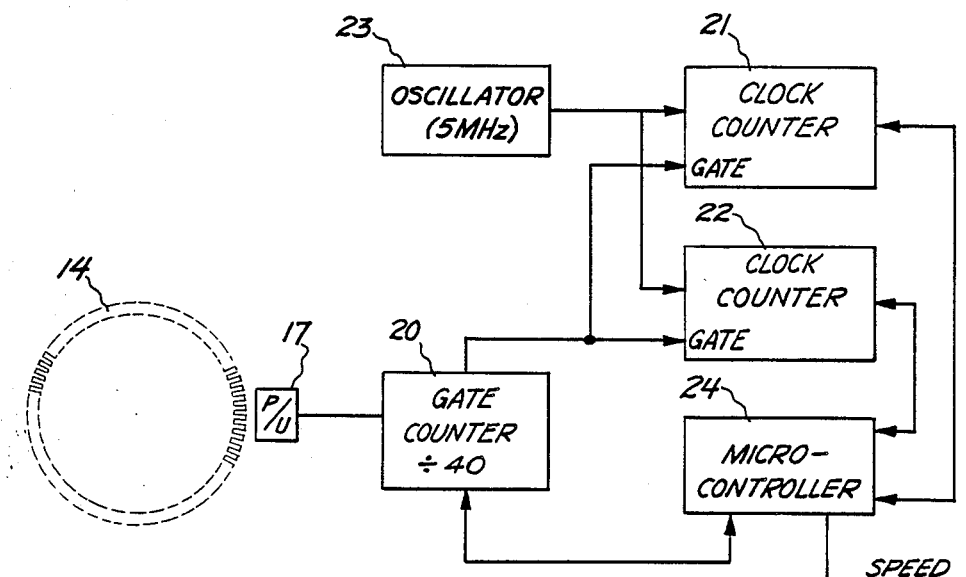
FIG. 2 shows the digital speed sensor input and the speed control.
Figure 3:
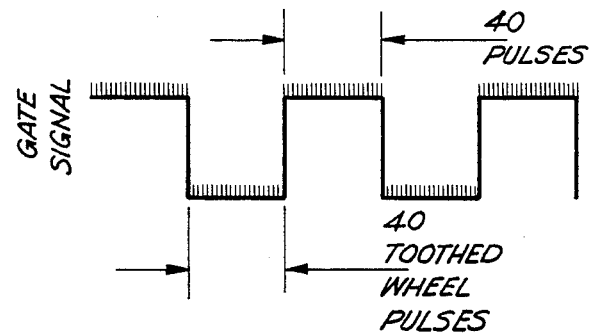
FIG. 3 illustrates the gate signal which changes state after a designated number of sensor pulses are counted.

In FIG. 2, pulses generated by optical pickup system 17, one pulse per tooth on wheel 14, are presented to a gate counter 20 which is programmed to toggle its output by a count of 40. The gate counter output is connected to the gate inputs of a pair of clock counters 21 and 22, and the source inputs of both are connected to a 5 MHz reference frequency oscillator 23. One of the clock counters 21 or 22 is programmed to count when its gate is high, and the other counts when its gate is low. This is illustrated in FIG. 3 where the binary gate signal produced by gate counter 20 switches state after the given number of sensor pulses, 40 in this case, are counted. As motor speed decreases, it takes a longer time to toggle the gate signal, and a shorter time if the motor is above the set speed. Clock counters 21 and 22 are alternately enabled for counting by the gate signal, and the number of counts accumulated depends on the length of the gated on interval which in turn depends upon the speed of the motor. With a 5 MHz reference frequency and at a set speed of 3600 RPM, the gate signal will allow an accumulation of 41666 counts (one per cycle or pulse). If the sensed speed is above set speed the number of counts is smaller, and conversely is larger for an underspeed condition. The speed related counts are alternately read out from clock counters 21 and 22 into single-chip microcontroller 24.

This method serves two purposes. It doubles the sample rate of the system. It also allows the microcontroller software time to read the clock counter that is now turned off from the reference by the gate level after the gate toggle has transpired. The speed related counts read out during the gated off interval of the counter are read without interference with the ongoing, real time, count process in the other counter. The speed error is then calculated based upon this current count information and output from the system as a speed error signal. The speed error is determined by subtracting the speed related count from a known count corresponding to the chosen set speed. For the example given the accumulated count is subtracted from 41666, or vice versa, and the count differential is multiplied by a scale factor to yield the speed error signal. The microcontroller has only a small amount of time, such as 1.5 milliseconds, to make this calculation. Time consuming math calculations may be minimized by properly pre-calculating the number of tooth wheel pulses that are counted to form the gate interval, and the reference frequency that the count information is derived from for the duration of the gate interval. By modifying either or both of these, various speed set points may be maintained. The speed error that is output is well within the 0.01% resolution required.

The speed transducer may have a magnetic input and may be a linear shaft encoder or bar encoder, for instance. The transducer provides digital information directly, but does not have the resolution wanted. Furthermore, another stable source of high frequency pulses may be substituted for the reference frequency oscillator.

Figure 4:
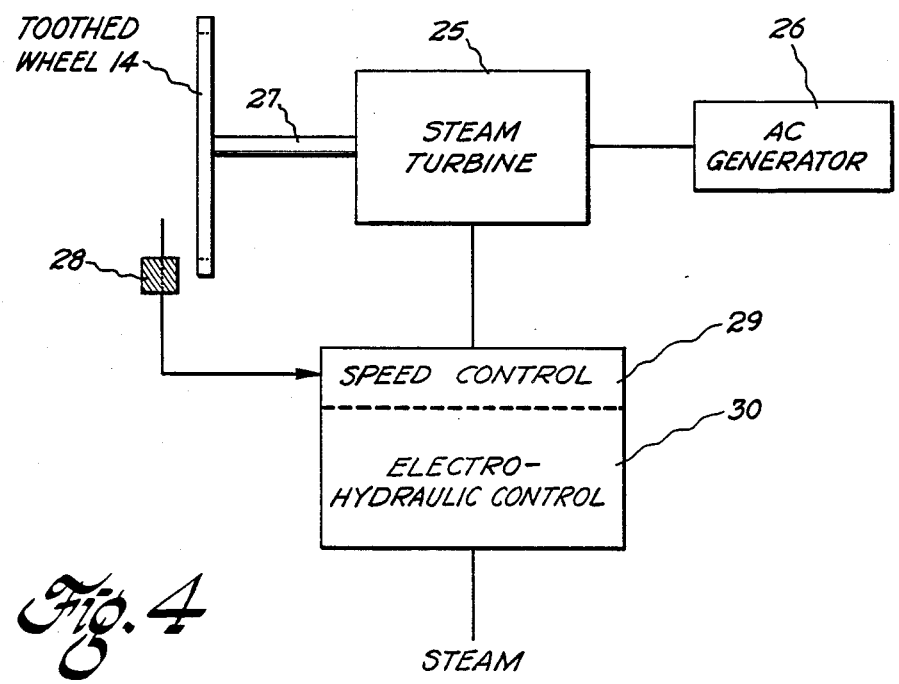
FIG. 4 is a simplified diagram of a steam turbine-generator set and the improved speed control.

Another application of the speed regulator digital speed controller is in the steam and gas turbine controls area. FIG. 4 shows a large steam turbine 25 and AC generator 26; a more detailed diagram is in U.S. Pat. No. 4,335,600 and the encyclopedia reference cited in that specification. Toothed wheel 14 is secured to the rotating rotor shaft 27 and passage of the teeth of the wheel is detected by a magnetic pickup 28. Pulses generated by this digital speed sensor are presented to the digital speed control unit 29 which is a part of the electrohydraulic controls 33; the latter governs the steam supplied to the turbine and typically has speed, acceleration, and steam flow controls. Some existing large steam turbines have an 80 tooth rotating wheel and magnetic pickup which provides pulses proportional to speed to an analog speed controller. The advantage of retaining the same toothed wheel and digital speed sensor is that the new digital speed controller is more conveniently retrofit to equipment already in service.

Figure 5:
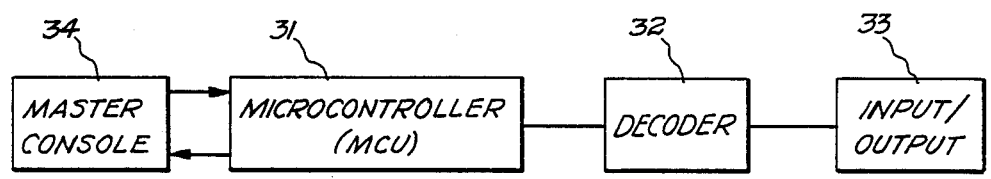
FIG. 5 shows the main components of the digital speed controller and the link between the single-chip microcontroller and the master console.

FIG. 5 illustrates major components of the digital speed controller, namely the single-chip microcontroller 31, decoder 32 and input/output 33, and that there is two-way communications between the microcontroller 31 and the turbine-generator set master console 34. Using a standard RS232 link, digital speed controller status information is sent to the master console which in turn transmits commands to the microcontroller. The input/output may be comprised of a multiple counter/timer chip such as the AMD9513 available from Advanced Micro Devices, a 12-bit digital-to-analog converter, an optical or magnetic pickup for tooth wheel sensing, and serial communications which are RS232 compatible.

Figure 6:
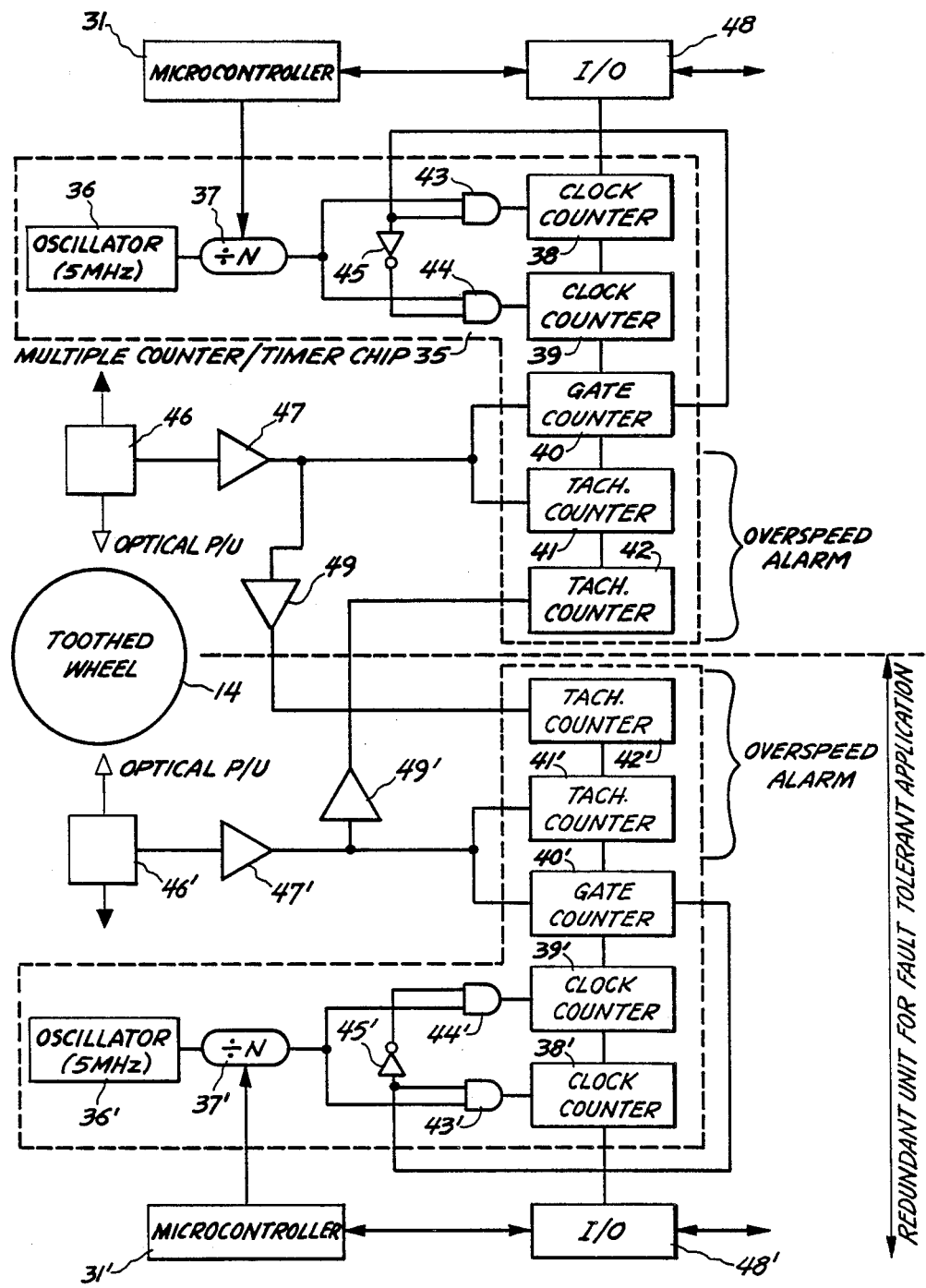
FIG. 6 is a block diagram of the speed control with the addition of an overspeed alarm and a redundant unit for fault tolerant applications.

FIG. 6 is a schematic diagram of a high performance digital speed controller for turbine controls which has an overspeed alarm and a redundant unit for fault tolerant application. The counter and timer chip 35 is comprised of a 5 MHz reference frequency oscillator 36, a divider 37 set by the microcontroller 31 (in this case N=1), first and second clock counters 38 and 39, a gate counter 40, and two tachometer counters 41 and 42. The logic performed by the software is illustrated by hardware equivalants. Thus, the oscillator output signal is presented to AND devices 43 and 44, and the second input to both is the gate signal from gate counter 40. Inverter 45 signifies that one counter is gated to accumulate reference frequency counts when the gate signal is high, the other when the gate signal is low. This embodiment has an optical pickup system 46; as the teeth on toothed wheel 14 interrupt the optical path between light source and detector, sensor pulses are generated that are amplified at 47 and fed to gate counter 40. Briefly reviewing, gate counter 40 is programmed to toggle its output by a count of 40 pulses. The gate signal output is connected to the gate inputs of clock counters 38 and 39 which accumulate reference frequency counts alternately. The duration of the gated on interval controls the number of counts that are stored and is proportional to turbine speed. During alternate gated off intervals the speed related counts stored by each clock counter are read out through input/output 48 to microcontroller 31 to calculate the speed error. These calculations are performed in real time by the microcontroller software.

Tachometer counters 41 and 42 have an overspeed alarm function. The sensor pulses passing through amplifier 47 are presented to the first tachometer counter 41, and if an overspeed condition is detected an alarm is sent to the master console. In the redundant speed unit corresponding components are indicated by primed numerals. The upper and lower digital speed controllers operate simultaneously and if one fails the speed error is provided from the still operating unit. An overspeed condition may be detected by both digital speed controllers. Sensor pulses from the upper speed unit are presented to amplifier 49 and hence to tachometer counter 42'. Both speed controllers can generate the overspeed alarm. Likewise, sensor pulses from the lower speed unit are fed to tachometer counter 42 in the upper unit.

Figure 7:
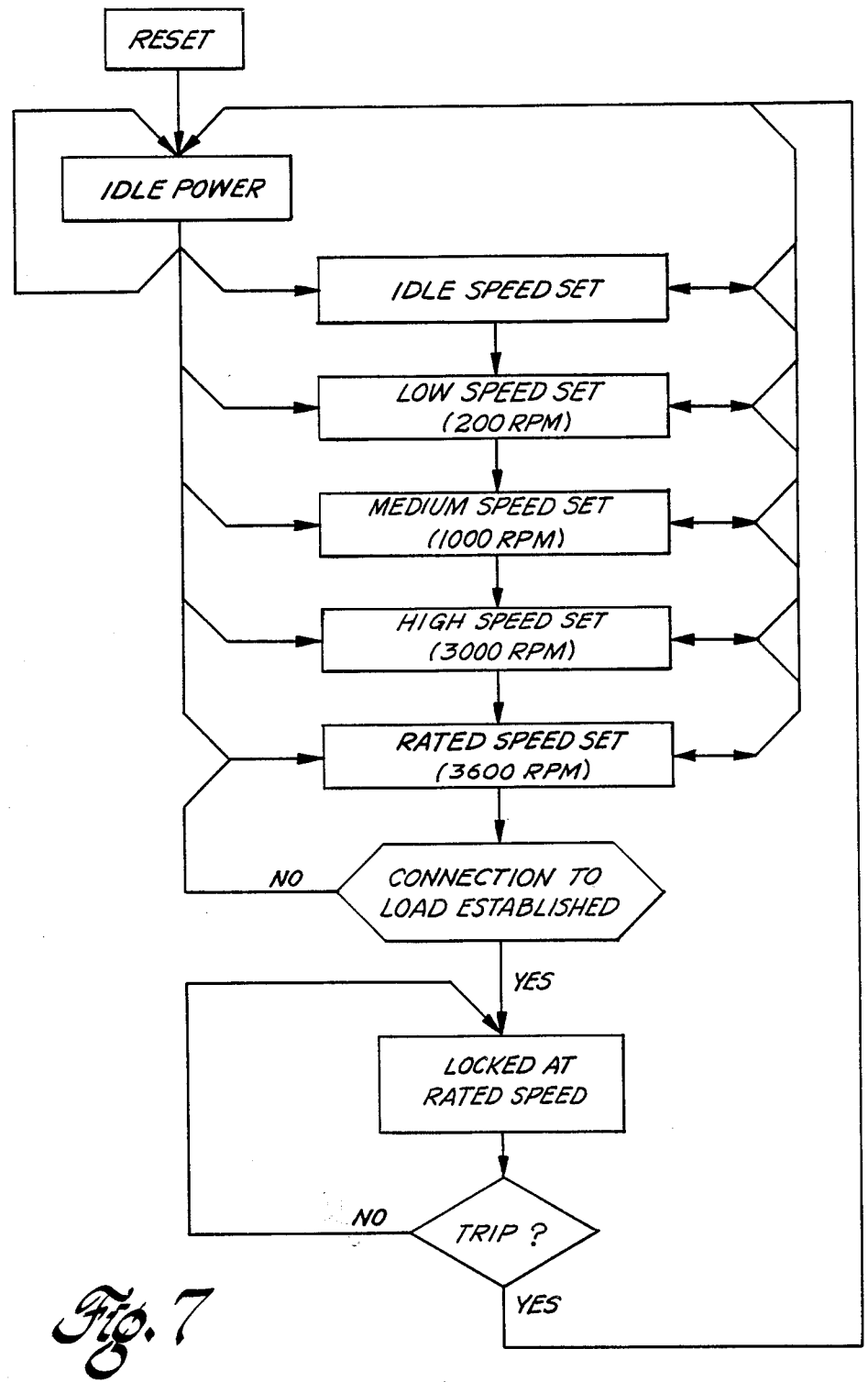
FIG. 7 is a flow chart of the steps in bringing the steam turbine up to rated speed and tripping in the event of an overspeed condition.

The flow diagram in FIG. 7 shows a typical sequence of operations in controlling the speed of a steam turbine.

Because of the long time to bring the steam turbine up to rated speed, as much as a full day, there are a plurality of operator selected speed set points: 200 RPM, 1000 RPM, 3000 RPM, and 3600 RPM. At idle power the steam is off. Turbine speed is controlled and sequentially increased from idle speed to low, medium, high and rated speeds. At 3600 RPM, connection of the generator to the load is established and the steam turbine is locked at rated speed. An overspeed alarm causes circuit breakers to trip and the steam turbine is reset to idle power. One digital control demonstrates closed loop speed control at the operator selected speed set points given in the diagram. The selectable regulation rates the system adheres to are: 2.5%, 5.0% and 7.5%. Closed loop acceleration and deceleration between set points can be set and maintained at the following rates: 3%, 5% and 10% of rated speed per minute. Set point control to and indication of status from the digital controller are via full duplex serial communication lines at 1200 baud asynchronous in a binary format. Any of these parameters can be easily modified in PL/M-51 software.

The individual source code listings which accomplish these objectives for the described DC motor controller is given below in the Appendix.

While the invention has been particularly shown and described with reference to preferred embodiments thereof, it will be understood by those skilled in the art that various changes in form and details may be made without departing from the spirit and scope of the invention as defined in the appended claims.

A P P E N D I X

```
PL/M-51 COMPILER

ISIS-II PL/M-51 V1.0
COMPILER INVOKED BY:   :F1:PLM51 :F5:MOTABG CODE SYMBOLS XREF DEBUG 1   1       SBEGIN: DO;
    2   2           INIT: PROCEDURE EXTERNAL;
    3   1           END INIT;

4   2           DO;
    5   2               CALL INIT;
    6   2           END;
    7   1       END;

PL/M-51 COMPILER

ISIS-II PL/M-51 V1.0
COMPILER INVOKED BY:   :F1:PLM51 :F5:MOTARQ CODE SYMBOLS XREF DEBUG 1   1       EX1: DO;
    2   1           DECLARE SPEED$ERROR$PORT ADDRESS EXTERNAL AUXILIARY,
                        CLOSE$VALVES$VALUE WORD EXTERNAL CONSTANT;
    3   2           CLOSE$VALVES$IRQ: PROCEDURE INTERRUPT 2 PUBLIC;
    4   3               DO WHILE 1;
```

```
5   3               SPEED$ERROR$PORT = CLOSE$VALVES$VALUE;
6   3           END;
                /* WE NEVER WANT TO RETURN FROM THIS EXCEPT BY HARDWARE RESET*/
7   2       END;
8   1   END;
```

PL/M-51 COMPILER

ISIS-II PL/M-51 V1.0
COMPILER INVOKED BY:   :F1:PLM51 :F5:MOTA$G CODE SYMBOLS XREF DEBUG

```
1   1   $BEGIN: DO;
2   2       INIT: PROCEDURE EXTERNAL;
3   1       END INIT;

4   2       DO;
5   2           CALL INIT;
6   2       END;
7   1   END;
```

PL/M-51 COMPILER

ISIS-II PL/M-51 V1.0
COMPILER INVOKED BY:   :F1:PLM51 :F5:MOTARQ CODE SYMBOLS XREF DEBUG

```
1   1   EX1: DO;
2   1       DECLARE SPEED$ERROR$PORT ADDRESS EXTERNAL AUXILIARY,
                CLOSE$VALVES$VALUE WORD EXTERNAL CONSTANT;
3   2       CLOSE$VALVES$IRQ: PROCEDURE INTERRUPT 2 PUBLIC;
4   3           DO WHILE 1;
5   3               SPEED$ERROR$PORT = CLOSE$VALVES$VALUE;
6   3           END;
                /* WE NEVER WANT TO RETURN FROM THIS EXCEPT BY HARDWARE RESET*/
7   2       END;
8   1   END;
```

PL/M-51 COMPILER

ISIS-II PL/M-51 V1.0
COMPILER INVOKED BY:   :F1:PLM51 :F1:MOTAIN CODE SYMBOLS XREF DEBUG

```
1   1   INITIALIZE: DO;

/*  REGISTER DECLARATIONS FOR 8051 */

2   1   DECLARE REG  LITERALLY 'REGISTER';

/******** BYTE REGISTERS ********/
3   1   DECLARE
            P0   BYTE   AT(80H)   REG,
            P1   BYTE   AT(90H)   REG,
            P2   BYTE   AT(0A0H)  REG,
            P3   BYTE   AT(0B0H)  REG,
            PSW  BYTE   AT(0D0H)  REG,
            ACC  BYTE   AT(0E0H)  REG,
            B    BYTE   AT(0F0H)  REG,
            SP   BYTE   AT(81H)   REG,
            DPL  BYTE   AT(82H)   REG,
            DPH  BYTE   AT(83H)   REG,
```

```
        TCON BYTE AT(88H) REG,
        TMOD BYTE AT(89H) REG,
        TL0  BYTE AT(8AH) REG,
        TL1  BYTE AT(8BH) REG,
        TH0  BYTE AT(8CH) REG,
        TH1  BYTE AT(8DH) REG,
        IE   BYTE AT(0A8H) REG,
        IP   BYTE AT(0B8H) REG,
        SCON BYTE AT(98H) REG,
        SBUF BYTE AT(99H) REG;

/******** BIT REGISTERS ********/

/********* PSW  BITS ********/
4   1   DECLARE
        CY   BIT  AT(0D7H) REG,
        AC   BIT  AT(0D6H) REG,
        F0   BIT  AT(0D5H) REG,
        RS1  BIT  AT(0D4H) REG,
        RS0  BIT  AT(0D3H) REG,
        OV   BIT  AT(0D2H) REG,
        P    BIT  AT(0D0H) REG,

/********* TCON BITS ********/
        TF1  BIT  AT(8FH) REG,
        TR1  BIT  AT(8EH) REG,
        TF0  BIT  AT(8DH) REG,
        TR0  BIT  AT(8CH) REG,
        IE1  BIT  AT(8BH) REG,
        IT1  BIT  AT(8AH) REG,
        IE0  BIT  AT(89H) REG,
        IT0  BIT  AT(88H) REG,
```

PL/M-51 COMPILER    INITIALIZE

```
        /********* IE BITS ********/
        EA   BIT  AT(0AFH) REG,
        ES   BIT  AT(0ACH) REG,
        ET1  BIT  AT(0ABH) REG,
        EX1  BIT  AT(0AAH) REG,
        ET0  BIT  AT(0A9H) REG,
        EX0  BIT  AT(0A8H) REG,

/********* IP BITS ********/
        PS   BIT  AT(0BCH) REG,
        PT1  BIT  AT(0BBH) REG,
        PX1  BIT  AT(0BAH) REG,
        PT0  BIT  AT(0B9H) REG,
        PX0  BIT  AT(0B8H) REG,

/********* P3 BITS ********/
        RD   BIT  AT(0B7H) REG,
        WR   BIT  AT(0B6H) REG,
        T1   BIT  AT(0B5H) REG,
        T0   BIT  AT(0B4H) REG,
        INT1 BIT  AT(0B3H) REG,
        INT0 BIT  AT(0B2H) REG,
        TXD  BIT  AT(0B1H) REG,
        RXD  BIT  AT(0B0H) REG,

/********* SCON BITS ********/
        SM0  BIT  AT(9FH) REG,
        SM1  BIT  AT(9EH) REG,
        SM2  BIT  AT(9DH) REG,
        REN  BIT  AT(9CH) REG,
        TB8  BIT  AT(9BH) REG,
        RB8  BIT  AT(9AH) REG,
        TI   BIT  AT(99H) REG,
        RI   BIT  AT(98H) REG;
```

```
5   1       DECLARE RATEDSTABLE (30) BYTE PUBLIC CONSTANT
                (02DH,001H,000H,000H,000H,000H,
                 02DH,002H,000H,000H,000H,000H,
                 02AH,003H,0D8H,0FFH,000H,000H,
                 02DH,084H,000H,000H,000H,000H,
                 02DH,0A5H,000H,000H,000H,000H),
                BIAS BYTE PUBLIC,
                MODE1 BYTE PUBLIC CONSTANT (011H),
                STCSDAT BYTE PUBLIC AT(1800H) AUXILIARY,
                STCSCMD BYTE PUBLIC AT(1801H) AUXILIARY,
                RATEDSSETSVALUE WORD PUBLIC CONSTANT (41666),
                SPEEDSERROR WORD EXTERNAL,
                TIMSCON WORD PUBLIC CONSTANT (0FC17H),
                SPEEDSERRORSPORT ADDRESS PUBLIC AT(1000H) AUXILIARY,
                WRSSTCSDATSPTR ADDRESS PUBLIC,
                CLOSESVALVESSVALUE WORD PUBLIC CONSTANT (0A00H),
                MS1000 WORD EXTERNAL,
                MS0100 BYTE EXTERNAL,
                MS0010 BYTE EXTERNAL,
                MOTSBIT BIT PUBLIC,
```

PL/M-51 COMPILER     INITIALIZE

```
                ACCSBIT BIT PUBLIC,
                AL BIT PUBLIC,
                AM BIT PUBLIC,
                AH BIT PUBLIC;
6   2           TOGO: PROCEDURE EXTERNAL;
7   1           END TOGO;
8   2           WRITESSTC: PROCEDURE EXTERNAL;
9   1           END WRITESSTC;
10  2           CLOSESVALVESSIRQ: PROCEDURE EXTERNAL;
11  1           END CLOSESVALVESSIRQ;
12  2           READSSTC: PROCEDURE EXTERNAL;
13  1           END READSSTC;
14  2           SESCALC: PROCEDURE EXTERNAL;
15  1           END SESCALC;
16  2           WRITESDAC: PROCEDURE EXTERNAL;
17  1           END WRITESDAC;
18  2           MOTSACCEL: PROCEDURE EXTERNAL;
19  1           END MOTSACCEL;
20  2       INIT: PROCEDURE PUBLIC;
21  3           DO;
22  3               SPEEDSERRORSPORT = CLOSESVALVESSVALUE;

23  3               TMOD = MODE1;
24  3               EXI = 0;
25  3               PX1 = 1;
26  3               ET0 = 1;
27  3               PT0 = 0;

28  3               ENABLE;

29  3               MOTSBIT = 1;
30  3               ACCSBIT = 0;
31  3               AL = 1;
32  3               AM = 0;
33  3               AH = 0;

34  3               MS1000 = 0;
35  3               MS0100 = 0;
36  3               MS0010 = 0;

37  3               TR0 = 0;
38  3               TL0 = LOW(TIMSCON);
39  3               TH0 = HIGH(TIMSCON);
40  3               TR0 = 1;

41  3               BIAS = 0;
42  3               SPEEDSERROR = CLOSESVALVESSVALUE;
43  3               CALL MOTSACCEL;
```

```
44   3          WR$STC$DAT$PTR = .RATED$TABLE;
45   3          CALL WRITE$STC;
46   3          EX1 = 1;

47   3          CALL TOGO;
48   3        END;
49   2      RETURN;
50   2    END
```

PL/M-51 COMPILER    INITIALIZE

```
51   1   END;
```

PL/M-51 COMPILER

ISIS-II PL/M-51 V1.0
COMPILER INVOKED BY:  :F1:PLM51 :F1:MOTAWR CODE SYMBOLS XREF DEBUG

```
 1   1      WRITE: DO;
 2   1         DECLARE MASTER$MODE WORD CONSTANT (0000$0001$0000$0000B),
             /* MAKE THE LSN OF MASTER MODE 'C' TO ENABLE ALARM ------ */
                 ALARM WORD CONSTANT (5280),
                 I BYTE,
                 WR$STC$DAT$PTR ADDRESS EXTERNAL,
                 WR$STC$DAT$CELL BASED WR$STC$DAT$PTR (30) BYTE CONSTANT,
                 STC$CMD BYTE EXTERNAL AUXILIARY,
                 STC$DAT BYTE EXTERNAL AUXILIARY;
 3   2      WRITE$STC: PROCEDURE PUBLIC;
 4   3         DO;
 5   3            STC$CMD = 0FFH; /* MASTER RESET COMMAND*/
 6   3            STC$CMD = 05FH; /* LOAD TO CLEAR TC*/
 7   3            STC$CMD = 007H; /* CONTROL CYCLE POINTER*/
 8   4            DO I = 0 TO 1;
 9   4               STC$DAT = LOW(ALARM);
10   4               STC$DAT = HIGH(ALARM);
11   4            END;
12   4            DO;
13   4               STC$DAT = LOW(MASTER$MODE);
14   4               STC$DAT = HIGH(MASTER$MODE);
15   4            END;
16   3            STC$CMD = 001H; /* ELEMENT CYCLE CTR. #1 POINTER*/
17   4            DO I = 0 TO 29;
18   4               STC$DAT = WR$STC$DAT$CELL(I);
19   4            END;
20   3            STC$CMD = 07FH; /* LOAD AND ARM ALL COUNTERS*/
21   3         END;
22   2      RETURN;
23   2      END;
24   1   END;
```

PL/M-51 COMPILER

ISIS-II PL/M-51 V1.0
COMPILER INVOKED BY:  :F1:PLM51 :F5:MOTATG CODE SYMBOLS XREF DEBUG

```
 1   1      TOGGLE: DO;
 2   1         DECLARE  TEST BIT,
                        FLIP BIT,
                        DIG$INT BIT,
                        MOT$BIT BIT EXTERNAL,
                        ACC$BIT BIT EXTERNAL,
                        ETO BIT AT (0A9H) REGISTER,
                        J BYTE,
```

```
                    SR3 BYTE,
                    STATUS BYTE,
                    LD$ARM$CTR$4 BYTE CONSTANT (068H),
                    LD$ARM$CTR$5 BYTE CONSTANT (070H),
                    RD$STC$DAT$CELL (1) BYTE EXTERNAL,
                    SE$POINTER ADDRESS PUBLIC,
                    HOLD$REG$CELL BASED SE$POINTER (5) WORD,
                    SPEED$ERROR WORD PUBLIC,
                    NEW$SPEED$ERROR WORD PUBLIC,
                    OLD$SPEED$ERROR WORD PUBLIC,
                    SPEED$ERROR$ACCUM WORD PUBLIC,
                    RATED$SET$VALUE WORD CONSTANT (41666),
                    STC$CMD BYTE EXTERNAL AUXILIARY,
                    MS1000 WORD EXTERNAL,
                    MS1000$CON WORD PUBLIC CONSTANT (1000),
                    MS0100 BYTE EXTERNAL,
                    MS0100$CON BYTE PUBLIC CONSTANT (100),
                    MS0010 BYTE EXTERNAL,
                    MS0010$CON BYTE PUBLIC CONSTANT (10);
3    2                  READ$STC: PROCEDURE EXTERNAL;
4    1                      END READ$STC;
5    2                      SE$CALC: PROCEDURE EXTERNAL;
6    1                      END SE$CALC;
7    2                      WRITE$DAC: PROCEDURE EXTERNAL;
8    1                      END WRITE$DAC;
9    2                      MOT$ACCEL: PROCEDURE EXTERNAL;
10   1                      END MOT$ACCEL;
11   2                      ACCEL$CALC: PROCEDURE EXTERNAL;
12   1                      END ACCEL$CALC;
13   2                      CHECK$ACCEL: PROCEDURE EXTERNAL;
14   1                      END CHECK$ACCEL;
15   2          TOGO: PROCEDURE PUBLIC;
16   3              DO;
17   3                  TEST = 0;
18   3                  SPEED$ERROR$ACCUM = RATED$SET$VALUE;
19   3                  SE$POINTER = .RD$STC$DAT$CELL;
20   3                  ETO = 1;
21   3              END;
             /*
             */
22   3              DO WHILE 1;
23   3                  STATUS=STC$CMD;
24   3                  SR3=STATUS AND 00001000B;
25   3                  IF SR3 = 0 THEN FLIP = 0;

PL/M-51 COMPILER    TOGGLE 27   3                  ELSE FLIP = 1;
28   3
29   3                  ETO =0;  /* DISABLE REAL TIME CLOCK INTERRUPT*/
30   3
31   3                  IF TEST XOR FLIP = 1 THEN
32   4                      DO;
33   4                          TEST = FLIP;
34   4                          CALL READ$STC;
35   4                          IF SR3=0 THEN
36   5                              DO;
37   5                                  STC$CMD=LD$ARM$CTR$4;
38   5                                  J=3;
39   5                                  SPEED$ERROR = HOLD$REG$CELL(J);
40   5                              END;
41   4                          ELSE
                                    DO;
42   5                                  STC$CMD=LD$ARM$CTR$5;
43   5                                  J=4;
44   5                                  SPEED$ERROR = HOLD$REG$CELL(J);
45   5                              END;
46   4                          SPEED$ERROR = RATED$SET$VALUE - SPEED$ERROR;
47   4                          CALL SE$CALC;
48   4                          CALL WRITE$DAC;
49   4                      END;
```

```
50    3                                        ETO = 1;- /* ENABLE RTC INTRQ */
51    4                                     DO;
52    4                                        IF MS1000 >= MS1000$CON THEN
53    5                                           DO;
54    5                                              MS1000 = 0;
55    5                                              CALL ACCEL$CALC;
56    5                                              IF ACC$BIT THEN      /
57    6                                                 DO;
58    6                                                    CALL CHECK$ACCEL;
59    6                                                 END;
60    5                                           END;
61    4                                        IF MS0100 >= MS0100$CON THEN
62    5                                           DO;
63    5                                              MS0100 = 0;
64    5                                           END;
65    4                                        IF MS0010 >= MS0010$CON THEN
66    5                                           DO;
67    5                                              MS0010 = 0;
68    5                                           END;
69    4                                     END;
70    3                                  END;
71    2                               RETURN;
72    2                            END;
73    1                         END;
```

PL/M-51 COMPILER

ISIS-II PL/M-51 V1.0
COMPILER INVOKED BY:   :F1:PLM51 :F5:MOTARD CODE SYMBOLS XREF DEBUG

```
1     1       READ: DO;
2     1          DECLARE I BYTE,
                         J BYTE,
                         RD$STC$DAT$CELL (10) BYTE PUBLIC,
                         STC$CMD BYTE EXTERNAL AUXILIARY,
                         STC$DAT BYTE EXTERNAL AUXILIARY;
3     2          READ$STC: PROCEDURE PUBLIC;
4     3             DO;
5     3                STC$CMD = 0BFH;
6     3                STC$CMD = 019H;
7     3                J=1;
                 /* THE RD$STC$DAT$PTR GYRATIONS FIX THE HI/LO BYTE SWAP CAUSED BY PL/M-51*/
8     4                DO I = 0 TO 4;
9     4                   RD$STC$DAT$CELL(J) = STC$DAT;
10    4                   J=J-1;
11    4                   RD$STC$DAT$CELL(J) = STC$DAT;
12    4                   J=J+3;
13    4                END;
14    3             END;
15    2          RETURN;
16    2          END;
17    1       END;
```

PL/M-51 COMPILER

ISIS-II PL/M-51 V1.0
COMPILER INVOKED BY:   :F1;PLM51 :F5:MOTASC CODE SYMBOLS XREF DEBUG

```
1     1       CALC: DO;
2     1          DECLARE SPEED$ERROR WORD EXTERNAL,
                         TEMP WORD,
                         SIGN BIT,
                         BIAS BYTE EXTERNAL,
                         AMASK WORD CONSTANT (0111$1111$1111$1111$B),
                         OMASK WORD CONSTANT (1111$1000$0000$0000$B),
                         SMASK WORD CONSTANT (0000$0111$1111$1111$B);
```

```
 3   2                   CLOSE$VALVES$IRQ: PROCEDURE EXTERNAL;
 4   1                   END CLOSE$VALVES$IRQ;
 5   2           SE$CALC: PROCEDURE PUBLIC;
 6   3               DO;
 7   3                   TEMP = SPEED$ERROR;
 8   3                   IF TEMP > 32767 THEN
 9   4                       DO;
10   4                           SIGN=1;
11   4                           SPEED$ERROR = NOT(SPEED$ERROR) AND AMASK;
12   4                       END;
13   3                   ELSE SIGN=0;
14   3               END;
15   3               DO;
16   3                   SPEED$ERROR = SPEED$ERROR + BIAS; /* LEAD NETWORK*/
17   3                   TEMP = SPEED$ERROR;
18   3                   IF TEMP > 2047 THEN
19   4                       DO;
20   4                           TEMP = SPEED$ERROR;
21   4                           IF SPEED$ERROR > 3822 AND NOT(SIGN) THEN CALL CLOSE$VALVES$IRQ;
23   4                           ELSE SPEED$ERROR = 2047;
24   4                       END;
25   3               END;
26   3               DO;
27   3                   IF SIGN THEN SPEED$ERROR = (NOT(SPEED$ERROR)) AND SMASK;
29   3                   ELSE SPEED$ERROR = SPEED$ERROR OR OMASK;
30   3               END;
31   2               RETURN;
32   2           END;
33   1       END;
```

PL/M-51 COMPILER.

ISIS-II PL/M-51 V1.0
COMPILER INVOKED BY:   :F1:PLM51 :F5:MOTAWD CODE SYMBOLS XREF DEBUG

```
 1   1       WRT$DAC: DO;
 2   1           DECLARE SPEED$ERROR$PORT ADDRESS EXTERNAL AUXILIARY,
                 SPEED$ERROR WORD EXTERNAL;
 3   2           WRITE$DAC: PROCEDURE PUBLIC;
 4   3               DO;
 5   3                   SPEED$ERROR$PORT = SPEED$ERROR;
 6   3               END;
 7   2           RETURN;
 8   2           END;
 9   1       END;
```

PL/M-51 COMPILER.

ISIS-II PL/M-51 V1.0
COMPILER INVOKED BY:   :F1:PLM51 :F5:MOTAAC CODE SYMBOLS XREF DEBUG

```
 1   1       ACCEL: DO;
 2   1           DECLARE ACC$BIT BIT EXTERNAL,
                 ACC$VAR WORD PUBLIC;
 3   2           ACCEL$CALC: PROCEDURE PUBLIC;
 4   3               DO;
 5   3                   ACC$VAR = 0;
 6   3               END;
 7   2           RETURN;
 8   2           END;
 9   1       END;
```

PL/M-51 COMPILER

```
ISIS-II PL/M-51 V1.0
COMPILER INVOKED BY:   :F1:PLM51  :F5:MOTACA CODE SYMBOLS XREF DEBUG 1   1      CHECK: DO;
   2   1         DECLARE AL BIT EXTERNAL,
                     AM BIT EXTERNAL,
                     AH BIT EXTERNAL,
                     ACCSVAR WORD EXTERNAL;
   3   2         CHECKSACCEL: PROCEDURE PUBLIC;
   4   3            DO;
   5   3               ACCSVAR = 0;
   6   3            END;
   7   2            RETURN;
   8   2         END;
   9   1      END;
```

PL/M-51 COMPILER

```
ISIS-II PL/M-51 V1.0
COMPILER INVOKED BY:   :F1:PLM51  :F5:MOTAMT CODE SYMBOLS XREF DEBUG 1   1      MOT: DO;
   2   1         DECLARE MOT$BIT BIT EXTERNAL,
                     SPEED$ERROR WORD EXTERNAL,
                     MS0010 BYTE EXTERNAL,
                     MS0010$CON BYTE EXTERNAL CONSTANT;
   3   2            WRITE$DAC: PROCEDURE EXTERNAL;
   4   1            END WRITE$DAC;
   5   2         MOT$ACCEL: PROCEDURE PUBLIC;
   6   3            DO WHILE MOT$BIT;
   7   3      MOTO:    IF MS0010 < MS0010$CON THEN GO TO MOTO;
   9   3               MS0010 = 0;
  10   3               SPEED$ERROR = SPEED$ERROR - 1;
  11   3               CALL WRITE$DAC;
  12   3               IF SPEED$ERROR <= 2047 THEN MOT$BIT = 0;
  14   3            END;
  15   2            RETURN;
  16   2         END;
  17   1      END;
```

The invention claimed is:

1. A digital speed controller for rotating machinery comprising:
   means for continuously sensing the speed of rotation of said machinery and generating sensor pulses at a rate that is dependent on speed and too low to yield a wanted speed resolution;
   means for counting said sensor pulses and toggling a gate signal after a preset number are counted;
   a source of high reference frequency pulses;
   at least two clock counters to which said reference pulses are input and that are alternately enabled by said gate signal to count the number of reference pulses during a gated on interval; and
   a single-chip microcontroller to read said clock counters during respective gated off intervals and calculate in real time a speed error based upon current count information that has a high degree of resolution.

2. The digital speed controller of claim 1 wherein said speed sensing means is comprised of a toothed wheel on said machinery and a pickup to generate said sensor pulses.

3. The digital controller of claim 1 wherein said high reference frequency source is a megahertz range oscillator.

4. The digital speed controller of claim 3 wherein there are only two of said clock counters, one counting when said gate signal is high and the other when said gate signal is low.

5. The digital speed controller of claim 1 wherein said microcontroller has means to determine said speed error from the difference between a known count corresponding to a set speed and said current count, and has means to change said set speed.

6. A speed regulator digital speed controller for an electric motor comprising
   means for continuously sensing motor speed and generating a train of sensor pulses at a rate dependent on speed;
   a gate counter to count said sensor pulses and toggle a binary gate signal after a preset number are counted;
   a high reference frequency source;
   first and second clock counters which both have an input connected to said reference frequency source and are alternately enabled by said gate signal and during respective gated on intervals provide speed related counts;

a single-chip microcontroller that reads said clock counters alternately and processes said speed related counts to calculate a speed error; and means for controlling the voltage supplied to said motor to reduce said speed error toward zero.

7. The digital speed controller of claim 6 wherein said speed sensing means is comprised of a toothed wheel on a motor shaft and an optical pickup to generate said sensor pulses.

8. The digital speed controller of claim 6 wherein said reference frequency source is a megahertz range oscillator.

9. The digital speed controller of claim 8 wherein said microcontroller has means to calculate said speed error from said speed related counts and a known count corresponding to a set speed, and has means to change said set speed upon command.

10. A speed regulator digital speed controller for a steam or gas turbine comprising:

means for continuously sensing turbine speed and generating a train of sensor pulses at a rate dependent on speed;

a gate counter to count said sensor pulses and toggle a binary gate signal after a preset number are counted;

a high reference frequency source;

first and second clock counters which both have an input connected to said reference frequency source and are alternately enabled by said gate signal and during respective gated on intervals provide speed related counts;

a single-chip microcontroller that reads said clock counters alternately and processes said speed related counts to calculate a speed error; and means for controlling the steam or gas supplied to said turbine to reduce the speed error toward zero.

11. The digital speed controller of claim 10 wherein said speed sensing means is comprised of a toothed wheel on a rotating turbine shaft and an optical pickup to generate said sensor pulses.

12. The digital speed cntroller of claim 10 wherein reference frequency source is a megahertz range oscillator.

13. The digital speed controller of claim 12 wherein said microcontroller has means to determine said speed error from the difference between said speed related counts and a known count corresponding to a set speed, and has means to change said set speed upon command and increase speed by stages.

14. The digital speed controller of claim 13 further comprising a tachometer counter which counts said sensor pulses and issues an alarm upon detecting an overspeed condition.

* * * * *